Sept. 13, 1938. W. B. EWING 2,129,999
POST SUPPORTING STRUCTURE AND MANUFACTURE THEREOF
Filed May 18, 1935 2 Sheets-Sheet 1
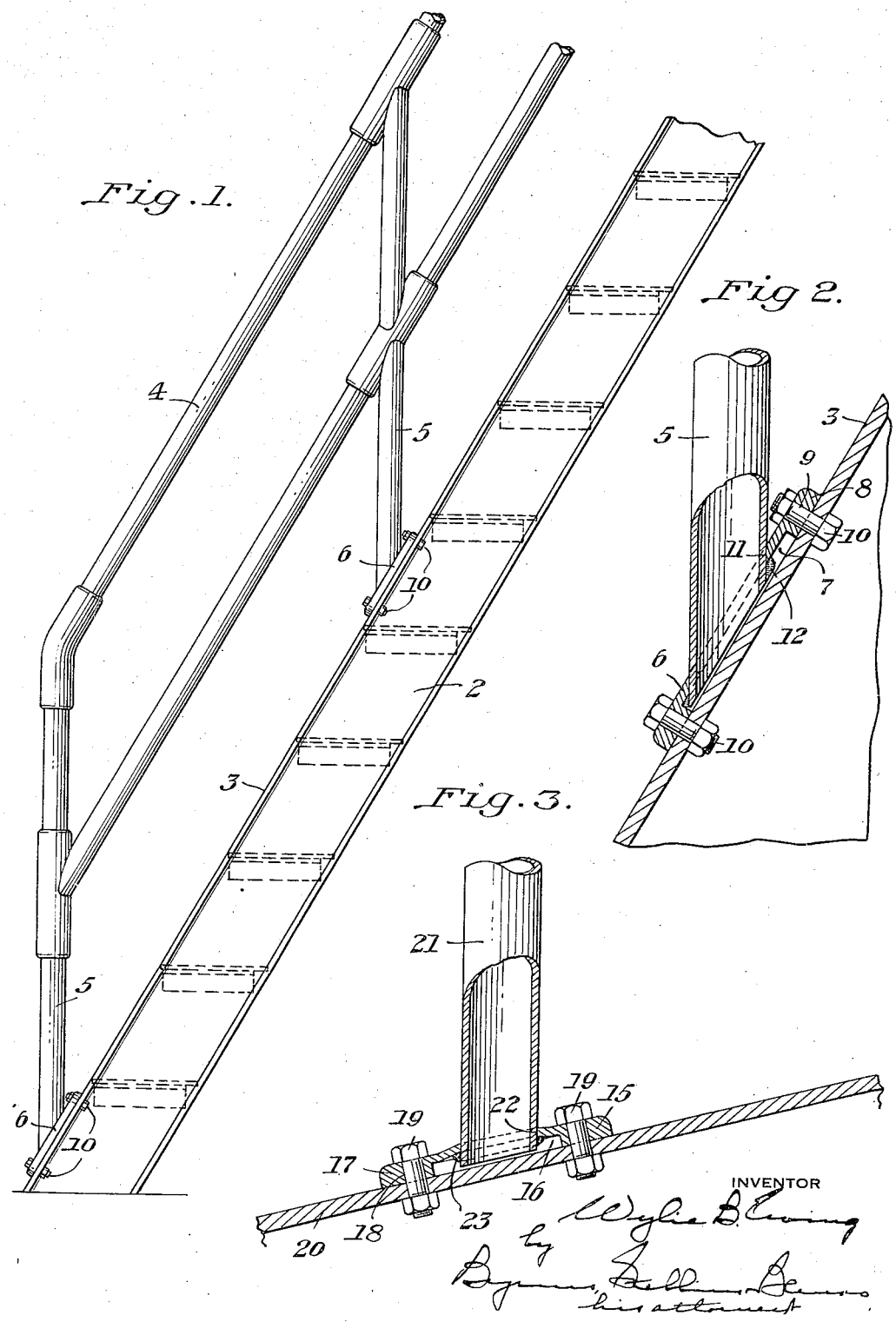

Sept. 13, 1938.  W. B. EWING  2,129,999
POST SUPPORTING STRUCTURE AND MANUFACTURE THEREOF
Filed May 18, 1935  2 Sheets-Sheet 2
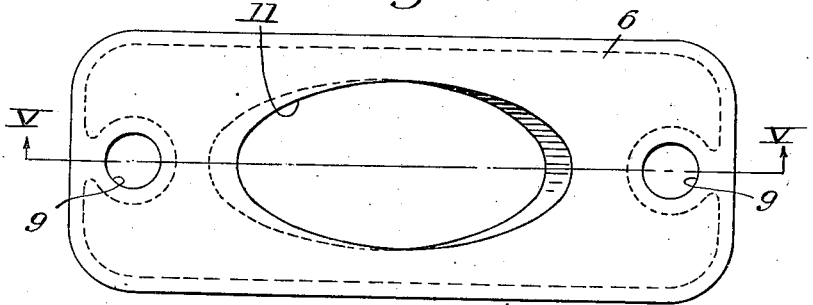
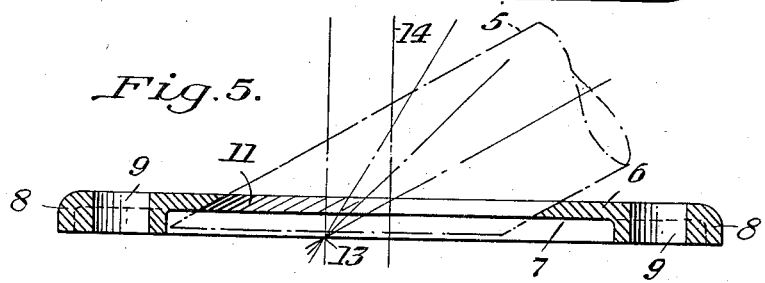
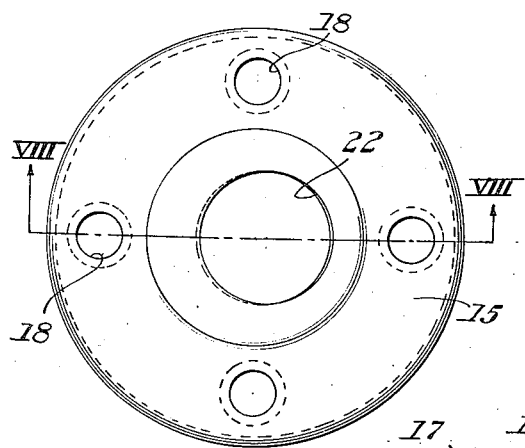
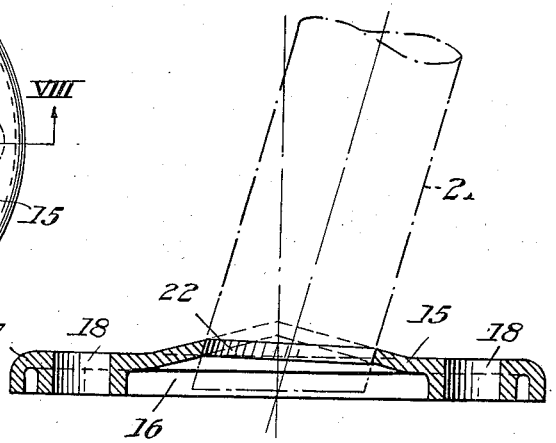
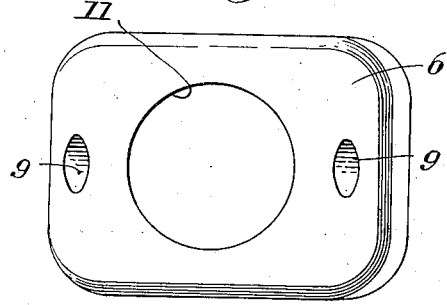
INVENTOR
Wylie B. Ewing Patented Sept. 13, 1938

2,129,999

UNITED STATES PATENT OFFICE 2,129,999

POST SUPPORTING STRUCTURE AND MANUFACTURE THEREOF

Wylie B. Ewing, Wheeling, W. Va., assignor, by mesne assignments, to Vulcan Rail and Construction Company, Maspeth, N. Y., a corporation of New York Application May 18, 1935, Serial No. 22,237

15 Claims. (Cl. 29—148.2)

This invention relates broadly to post supporting structures and the manufacture thereof. It relates particularly to structures for supporting metal posts such as are used, for example, in hand and guard railings and to certain methods of fabricating the same through which important advantages in strength and economy are obtained.

Purely for purposes of explanation and illustration the invention will be described in connection with the manufacture of a hand railing. Railing of this type is commonly made up of lengths of pipe of appropriate size, there being spaced uprights or posts between which extend longitudinal rail members. The posts are supported on a suitable base which may, for example, be an inclined stringer along the side of a flight of stairs, a ramp floor or the floor of a walk, porch, balcony or the like.

It has heretofore been customary to support the posts of railing of the type in question by cast fittings which are attached to the base and which have internally threaded sockets into which the ends of the uprights are adapted to be screwed. These fittings have to be accurately tapped and when the base is inclined it is necessary to use special castings so as to provide sockets extending at the desired angle to the base. For each different angle of inclination a different set of castings has to be provided as the posts in all ordinary railing structures are upright. As it has in the past been necessary to order special castings for various jobs, this has entailed great delay and inconvenience and the cost of the special castings has been high. Each casting has to be tapped after it is cast and the work must be accurately done in order that the post to be supported thereby will be upright.

I eliminate the necessity of providing special castings and of tapping the same by utilizing an attaching member adapted to be attached to a base and having provision for welding of the post thereto, which welding can be effected either in the shop or in the field. I preferably provide a post receiving opening in the attaching member and insert the post into such opening and connect together the attaching member and post at an unexposed portion of the structure, preferably by welding. When the welding is done at an unexposed portion of the structure it is unnecessary to grind the weld, thus effecting a great saving in cost. I preferably provide a space or recess at the bottom of the attaching member whereat the welding can be effected without interfering with attaching of the attaching member to the base and so that the weld will be invisible from without. In one of its preferred forms the attaching member takes the form of a plate having a recess in its bottom and a post receiving hole formed through the plate and communicating with such recess. The post receiving opening is formed in the attaching member so that its axis coincides with the axis of the post, and the opening is preferably of such size that the post fits neatly into it. When the railing is to be inclined at a relatively great angle the point of intersection of the axis of the opening and the surface of the attaching member is preferably eccentric of the attaching member, as will be explained. The method and apparatus for forming the openings in the attaching members are disclosed and claimed in my copending application Serial No. 44,721, filed October 12, 1935.

Other details, objects and advantages of the invention will become apparent as the following description of certain present preferred embodiments thereof and certain present preferred methods of practicing the same proceeds.

In the accompanying drawings I have shown certain present preferred embodiments of the invention, in which Figure 1 is an elevational view of a portion of a stairway provided with a hand railing;

Figure 2 is an enlarged detail vertical cross-sectional view through a portion of the structure shown in Figure 1;

Figure 3 is a view similar to Figure 2 showing a modified form;

Figure 4 is a plan view to further enlarged scale of the attaching member shown in Figure 2;

Figure 5 is a longitudinal central vertical cross-sectional view through the plate shown in Figure 4 taken on the line V—V of such figure;

Figure 6 is a top view of the plate shown in Figure 4 looking along the axis of the post receiving opening;

Figure 7 is a plan view of an attaching member of modified form such as shown in Figure 3; and Figure 8 is a central vertical cross-sectional view to enlarged scale through the attaching member shown in Figure 7 and taken on the line VIII—VIII of such figure.

Referring now more particularly to the form of structure shown in Figures 1, 2, 4, 5 and 6, there is shown more or less diagrammatically in Figure 1 a stairway designated generally by reference numeral 2 and having at the side thereof an inclined stringer 3 shown as being of plate metal. Mounted on the stringer 3 is a hand railing designated generally by reference numeral 4 and comprising uprights or posts 5. Each of the posts 5 is connected with the stringer 3 through the medium of an attaching member 6 shown as being in the form of a metal plate with a recess 7 in its bottom. The plate has a heavy outer portion 8 provided with bolt holes 9 through which pass bolts 10 for connecting the plate to the stringer.

The bottom of each post is cut off at the angle of the stringer as shown in Figure 2 and each of the attaching members or plates 6 has a hole 11 formed therethrough, the axis of the tool in forming it coinciding with the axis of the post to be inserted thereinto. The manner of forming the holes 11 in the attaching members is fully described and claimed in my copending application above referred to. The post is welded to the plate, preferably at the inside of the latter, the purpose of providing the recess 7 being to accommodate the welding material at the bottom of the plate so that it is out of sight in the finished structure without interfering with the attachment of the plate to the stringer. The welding is shown at 12 in Figure 2. The post is shown as having its bottom extending somewhat below the bottom of the central portion of the plate, but it will be understood that the bottom of the post need not extend below the bottom of the central portion of the plate and may be effectively welded to the plate if it stops flush with the metal of the plate or even above the lower surface thereof. The attaching member or plate may be connected with the stringer in any desired manner and need not necessarily be bolted thereto as shown. The bolt holes 9 may be omitted and the plate may, for example, be welded to the stringer, or, if desired, the holes 9 or similar holes may be provided and the plate may be button welded to the stringer through such holes.

When the axis of the hole through the attaching plate is inclined to the surface of the plate at a relatively great angle such axis does not necessarily pass through the center of the plate but a center may arbitrarily be chosen which may be used for forming inclined holes at various angles, as indicated at 13 in Figure 5. If desired either the upper or the lower face of the plate may have marked thereon a center for forming the post receiving hole or several centers to be used for forming holes at various angles. When the axis of the hole is perpendicular to the plate it passes through the center of the plate, as indicated at 14 in Figure 5.

The plate 6 is shown as being elongated because it is designed especially for use in supporting posts on inclined surfaces. This same plate may, of course, be used for supporting posts on horizontal surfaces, but the relatively great length of the plate 6 is not necessary in horizontal work and a round plate 15, as shown in Figures 3, 7 and 8, is preferably used when the axis of the post is perpendicular to the plate or extends only at a small angle from the perpendicular. The plate 15 is otherwise similar to the plate 6, having in its under surface a recess 16 and having a relatively heavy outer portion 17 through which are formed holes 18 receiving bolts 19 which fasten the plate to a base 20, shown as being of plate metal, and which may, for example, be a ramp floor. The post 21 extends through an opening 22 in the plate and is welded to the plate at the under side thereof and within the recess 16 as shown at 23.

My post supporting structure can be quickly and cheaply fabricated either in the shop or in the field without the necessity of ordering special castings or of any special machining. One or two standard forms of plate may be maintained in stock and holes may be formed in these as required as soon as the angle of incline is determined. By reason of the fact that the welding is hidden from view it is unnecessary to grind the weld, resulting, as above mentioned, in a great saving in cost due to the elimination of the necessity of grinding exterior welds. The structure is strong and rigid and can be fabricated and erected at remarkably low cost. Moreover, it is of pleasing appearance, the bulge about the base of the post provided by an internally threaded socket being eliminated. This feature is of particular advantage when the railing is of the flush type, that is to say, when all portions of the railing, including the uprights, longitudinally extending rails and joints, are of the same diameter.

While I have shown and described certain present preferred embodiments of the invention and certain present preferred methods of practicing the same, it is to be distinctly understood that the same is not limited thereto but may be otherwise variously embodied and practiced within the scope of the following claims.

I claim:

1. Post supporting structure, comprising an attaching member adapted to be attached to a base, said attaching member having an opening therein, a post having a portion within said opening, and means disposed at the surface of the attaching member adapted to be disposed next the base for connecting the post and fastening member together.

2. Post supporting structure, comprising an attaching member adapted to be attached to a base, said attaching member having an opening therein, and a post having a portion within said opening and welded to said attaching member at the surface of the attaching member adapted to be disposed next the base.

3. Post supporting structure, comprising an attaching member having a portion adapted to lie against a base and a portion adapted to be spaced from the base, a post having an end portion thereof disposed in cooperative relationship with the attaching member, and means disposed at that surface of the portion of the attaching member adapted to be spaced from the base which is adapted to be disposed facing the base for connecting the post and attaching member together.

4. Post supporting structure, comprising an attaching member having a portion adapted to lie against a base and a portion adapted to be spaced from the base and having an opening within the latter mentioned portion thereof, a post having a portion within said opening, and means disposed at the surface of the latter mentioned portion of the attaching member adapted to be disposed facing the base for connecting the post and attaching member together.

5. Post supporting structure, comprising an attaching member having a portion adapted to lie against a base and a portion adapted to be spaced from the base and having an opening within the latter mentioned portion thereof, and a post having a portion within said opening, said post and attaching member being welded together at the surface of the later mentioned portion of the attaching member adapted to be disposed facing the base.

6. Post supporting structure, comprising an attaching member adapted to be attached to a base, said attaching member having an opening therein, and a post having a portion within said opening, said post and attaching member being deposit welded together within the confines of the attaching member.

7. Post supporting structure, comprising an attaching member adapted to be attached to a base, said attaching member having an opening therein, and a post having a portion within said opening, said post and attaching member being deposit welded together at a point disposed generally in the direction in which the post extends from the surface of the attaching member adapted to lie against the base.

8. Post supporting structure, comprising an attaching member adapted to be attached to a base, said attaching member having an opening therein, and a post having a portion within said opening, said post and attaching member being deposit welded together adjacent said opening and at an unexposed portion of said structure.

9. Post supporting means, comprising an attaching member adapted to be attached to a base, said attaching member having an opening therein and having a space adjacent said opening and at an unexposed portion of the attaching member for welding thereto a portion of a post adapted to be inserted into said opening.

10. Post supporting means, comprising an attaching member of generally plate form adapted to be attached to a base and having a post receiving opening therein, the axis of said opening being inclined to the surface of the attaching member and intersecting such surface at a point nearer the edge of the attaching member toward which said axis is inclined than the opposite edge.

11. Post supporting means, comprising a generally planar plate having a portion adapted to lie against a base and a portion adapted to be spaced from the base, said plate having a pipe receiving opening therein intersecting said latter mentioned portion thereof, the surface of the plate defining such opening being so constructed and arranged as to snugly receive and lie parallel to the outer surface of a pipe introduced into the opening.

12. As an article of manufacture, post supporting means, comprising a plate adapted to be attached to a base, said plate having marked on a face thereof a center for forming a post receiving opening therein and being so constructed and arranged as to permit formation of such opening at various angles with respect thereto.

13. A method of forming a post supporting structure, comprising providing an attaching member of generally plate form adapted to be attached to a base, forming through said attaching member a hole of such size as to neatly receive a post, inserting a post into said hole, and connecting together said attaching member and post at an unexposed portion of said structure.

14. A method of forming a post supporting structure, comprising providing an attaching member having therein a post receiving opening, inserting a post into said opening, and deposit welding together the attaching member and post at an unexposed portion of said structure.

15. Post supporting structure, comprising an attaching member adapted to be attached to a base, said attaching member having an opening therein, and a post having an end portion within said opening and welded to said attaching member at a surface of the attaching member facing generally in the direction opposite the direction in which the post extends from the attaching member.

WYLIE B. EWING.